US010097910B2

United States Patent
Eddleston et al.

(10) Patent No.: US 10,097,910 B2
(45) Date of Patent: Oct. 9, 2018

(54) OPTICAL NETWORK DEVICE WITH INTEGRATED PORT MIRRORING

(71) Applicant: Calix, Inc., Petaluma, CA (US)

(72) Inventors: Charles J. Eddleston, Minneapolis, MN (US); Christopher T. Bernard, Wayzata, MN (US)

(73) Assignee: Calix, Inc., Petaluma, CA (US)

( * ) Notice: Subject to any disclaimer, the term of this patent is extended or adjusted under 35 U.S.C. 154(b) by 0 days.

(21) Appl. No.: 15/417,965

(22) Filed: Jan. 27, 2017

(65) Prior Publication Data
US 2017/0142506 A1 May 18, 2017

Related U.S. Application Data

(63) Continuation of application No. 14/470,517, filed on Aug. 27, 2014, now Pat. No. 9,591,386.

(51) Int. Cl.
*H04B 10/07* (2013.01)
*H04Q 11/00* (2006.01)
*H04L 12/931* (2013.01)

(52) U.S. Cl.
CPC ......... *H04Q 11/0067* (2013.01); *H04B 10/07* (2013.01); *H04L 49/208* (2013.01); *H04Q 2011/0088* (2013.01)

(58) Field of Classification Search
None
See application file for complete search history.

(56) References Cited

U.S. PATENT DOCUMENTS

| 8,325,727 | B2 | 12/2012 | Eddleston et al. |
| 8,600,057 | B2 | 12/2013 | Bernard et al. |
| 9,591,386 | B2 | 3/2017 | Eddleston et al. |
| 2003/0177216 | A1 | 9/2003 | Sutherland et al. |
| 2008/0031621 | A1 | 2/2008 | Kuo et al. |
| 2009/0238559 | A1 | 9/2009 | Pfeiffer et al. |
| 2010/0290783 | A1 | 11/2010 | Kazawa et al. |
| 2012/0128349 | A1 | 5/2012 | Mitsunaga et al. |

OTHER PUBLICATIONS

"GPON Monitor", TraceSpan Communications, Centralized Passive GPON Performance Monitor, Jan. 12, 2011, 4 pp.
ITU-T G.983.1, Series G: Transmission Systems and Media Digital Systems and Networks, Digital sections and digital line system-Optical line systems for local and access networks, Broadband optical access systems based on Passive Optical Networks (PON), The International Telecommunication Union. Jan. 2005, 124 pp.
ITU-T G.983.2, Series G: Transmission Systems and Media Digital Systems and Networks, Digital sections and digital line system-Optical line systems for local and access networks, ONT management and control interface specification for B-PON, The International Telecommunication Union. Jul. 2005, 370 pp.
(Continued)

*Primary Examiner* — Darren E Wolf
(74) *Attorney, Agent, or Firm* — Shumaker & Sieffert, P.A.

(57) ABSTRACT

Techniques are described for obtaining, by an optical network device (OND) coupled to an optical network, physical layer data of the optical network; generating, by the OND, an encapsulated representation of the physical layer data of the optical network; and outputting the encapsulated representation of the physical layer data to a diagnostic device.

20 Claims, 8 Drawing Sheets

(56) References Cited

OTHER PUBLICATIONS

ITU-T G.984.1, Series G: Transmission Systems and Media Digital Systems and Networks, Digital sections and digital ine system-Optical line systems for local and access networks, Gigabit-capable passive optical networks (GPON): General characteristics, The International Telecommunication Union. Mar. 2008, 43 pp.

ITU-T G.984.2, Series G: Transmission Systems and Media Digital Systems and Networks, Digital sections and digital line system—Optical line systems for local and access networks, Gigabit-capable passive optical networks (GPON): Physical Media Dependent (PMD) layer specification, The International Telecommunication Union. Mar. 2003, 38 pp.

ITU-T G.9843, Series G: Transmission Systems and Media Digital Systems and Networks, Digital sections and digital line system—Optical line systems for local and access networks, Gigabit-capable passive optical networks (GPON): Transmission convergence layer specification, The International Telecommunication Union. Mar. 2008, 146 pp.

ITU-T G.986, Series G: Transmission Systems and Media Digital Systems and Networks, Digital sections and digital line system—Optical line systems for local and access networks, 1 Gbits/s point-to-point Ethernet-based optical access system, The International Telecommunication Union. Jan. 2010, 20 pp.

ITU-T G.987, Series G: Transmission Systems and Media Digital Systems and Networks, Digital sections and digital line system—Optical line systems for local and access networks, 10-Gigabit-capable passive optical network (XG-PON) systems: Definitions, abbreviations and acronyms, The International Telecommunication Union. Jun. 2012, 26 pp.

ITU-T G.989.1, Series G: Transmission Systems and Media Digital Systems and Networks, Digital sections and digital line system—Optical line systems for local and access networks, 40-Gigabit-capable passive optical networks (NG-PON2): General requirements, The International Telecommunication Union. Mar. 2013, 26 pp.

Prosecution History from U.S. Appl. No. 14/470,517, dated Jan. 20, 2016 through Oct. 27, 2016, 90 pp.

OPTICAL NETWORK DEVICE WITH INTEGRATED PORT MIRRORING

This application is a continuation of U.S. patent application Ser. No. 14/470,517, filed Aug. 27, 2014 and entitled OPTICAL NETWORK DEVICE WITH INTEGRATED PORT MIRRORING, the entire contents of which is incorporated herein by reference.

TECHNICAL FIELD

This disclosure relates to networking, and more particularly, an optical network device with integrated port mirroring.

BACKGROUND

Network interface devices permit a subscriber to access a variety of information via a network. A passive optical network (PON), for example, can deliver voice, video, and data among multiple network nodes, using a common optical fiber link. Passive optical splitters and combiners enable multiple network interface devices such as optical network terminals (ONTs), also referred to as optical network units (ONUs), to share the optical fiber link. Each network interface device terminates the optical fiber link for a residential or business subscriber, and is sometimes referred to as a subscriber premises node that delivers Fiber to the Premises (FTTP) services.

In some systems, a network interface device is connected with wiring to one or more subscriber devices in the subscriber premises, such as televisions, set-top boxes, telephones, computers, or network appliances, which ultimately receive the voice, video, and data delivered via the PON. In this manner, the network interface device can support delivery of telephone, television, and Internet services to subscriber devices in the subscriber premises.

SUMMARY

In general, this disclosure describes example techniques for capturing physical layer data of an optical network by an optical network device (OND) such as an optical line terminal (OLT), an optical network unit (ONU) or the like.

As one example, a method includes obtaining, by an OND coupled to an optical network, physical layer data of the optical network; generating, by the OND, an encapsulated representation of the physical layer data of the optical network; and outputting the encapsulated representation of the physical layer data to a diagnostic device.

As another example, an OND coupled to an optical network includes a memory, and one or more processors. In this example, the one or more processors are configured to: obtain physical layer data of the optical network; generate an encapsulated representation of the physical layer data of the optical network; and output the encapsulated representation of the physical layer data to another device.

As another example, an OND coupled to an optical network includes means for obtaining physical layer data of the optical network; means for generating an encapsulated representation of the physical layer data of the optical network; and means for outputting the encapsulated representation of the physical layer data to a diagnostic device.

As another example, a computer-readable storage medium storing instructions that, when executed, cause one or more processors of an optical network device (OND) coupled to an optical network to obtain physical layer data of the optical network; generate an encapsulated representation of the physical layer data of the optical network; and output the encapsulated representation of the physical layer data to a diagnostic device.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
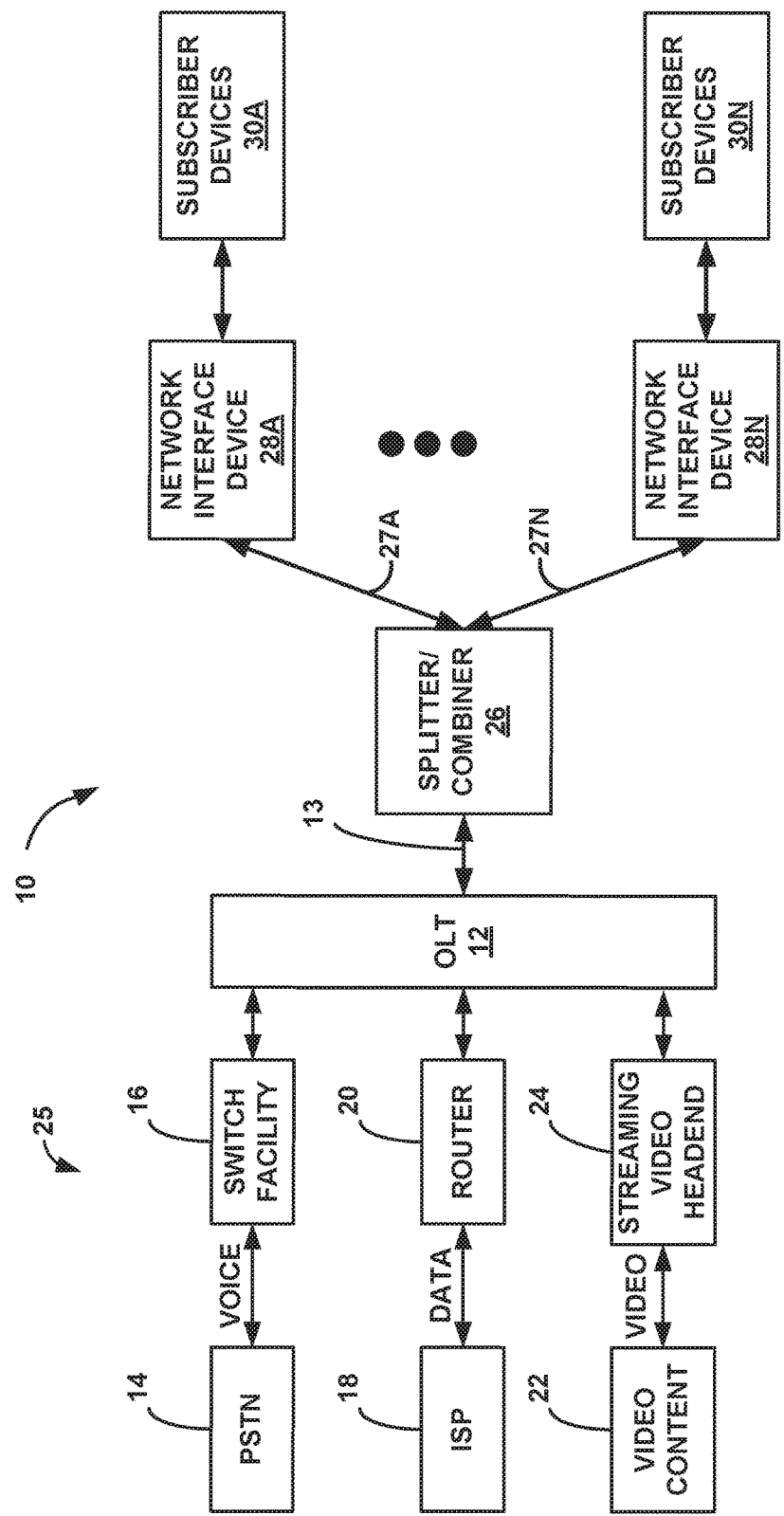
FIG. 1 is a block diagram illustrating a network, in accordance with one or more techniques of this disclosure.

An optical network includes an optical line terminal (OLT), an optical splitter/combiner, and a plurality of network interface devices such as optical network units (ONUs), also referred to as optical network terminals (ONTs). The OLT connects to the optical splitter/combiner with a fiber link, and each one of the network interface devices connect to the optical splitter/combiner with respective fiber links. In other words, there is a fiber link from the OLT to the optical splitter/combiner, and a plurality of fiber links (a fiber link for each network interface device) from the optical splitter/combiner to the network interface devices.

For downstream transmission, the OLT outputs an optical signal to the optical splitter/combiner, and the optical splitter/combiner transmits the optical signal to each network interface device via respective fiber links. For instance, responsive to receiving, from another network, data to be transmitted to the one or more network interface devices, the OLT may output an optical signal to the optical splitter/combiner that corresponds to the received data. Each of the network interface devices determine whether packets in the received optical signal are addressed to it or to another network interface device. The network interface devices process the packets in the optical signal when the packets in the optical signal are addressed to it, and otherwise may discard the packets.

For upstream transmission, each network interface device transmits a respective optical signal to the optical splitter/combiner, and the optical splitter/combiner combines the optical signal for transmission to the OLT. Each network interface device may reside at a subscriber premises, or a plurality of subscriber premises may share a common network interface device. Each network interface device receives data from devices at one or more subscriber premises, converts the received data into the optical signal, and outputs the optical signal to the OLT via respective fiber links and the optical splitter/combiner.

To avoid collision of the upstream optical signals from respective network interface devices, each network interface device may transmit the optical signal within an assigned timeslot. For example, the OLT may distribute a bandwidth map that assigns each of the network interface devices a timeslot within which to transmit the optical signal, and each network interface device transmits its optical signal within the begin and end time of the assigned timeslot. In some examples, the bandwidth map may assign the time slots by specifying the begin and end time, or by specifying a byte range which a network interface device may use to determine the begin and end time. The assigned timeslot is reserved for an upstream transmission from a given network interface device.

For example, each network interface device includes a controller, a laser driver, and a laser. The laser driver includes a laser control input, which may be a differential input, and based on the laser control input causes the laser to output an optical signal or not output an optical signal (e.g., turn on or turn off the laser based on the laser control input). When the laser is turned on, the laser is able to output an optical signal including optical ones and optical zeros. When the laser is turned off, the laser cannot output an optical signal and is essentially dark.

The controller for a given network interface device receives the information from the OLT that identifies the timeslot when the network interface device is to transmit an optical signal. The controller then outputs a voltage (e.g., a digital high) to the laser control input of the laser driver to instruct the laser driver to turn on the laser so that the laser outputs an optical signal during the assigned timeslot (e.g., outputs a digital high at the beginning of the timeslot). When the network interface device is not to transmit an optical signal (e.g., during non-assigned timeslots or at the conclusion of the timeslot), the controller outputs a voltage (e.g., a digital low) to the laser control input of the laser driver to instruct the laser driver to turn off the laser so that the laser does not output an optical signal during the non-assigned timeslots.

In some examples, it may be desirable to analyze the physical layer data of the optical network (e.g., to debug the optical network). For instance, as opposed to analyzing the data received by the network interface devices from the devices at the one or more subscriber premises and/or the data received by the OLT from the other network, the physical layer data may indicate additional data that may be useful to debug the optical network. In some examples, the physical layer data of the optical network may be captured for analysis with an additional device that may be coupled to the optical network via an additional optical splitter/combiner placed between the OLT and the network interface devices. However, in some examples, it may not be desirable couple an additional device to the optical network in order to capture the physical layer data.

In accordance with one or more techniques of this disclosure, an optical network device (OND) (e.g., an OLT and/or an ONU) coupled to an optical network may be configured to output a representation of physical layer data of the optical network. For instance, an OLT coupled to an optical network and another network may be configured to store a representation of the physical layer data, divide the representation into a plurality of segments that each include a portion of the representation of the physical layer data, encapsulate the plurality of segments into a plurality of frames that each include a respective segment of the plurality of segments and respective contextual information, and output the plurality of frames to another device that is not optically attached to the optical network. In this way, the OLT may enable the analysis of the physical layer data without requiring the attachment of an additional device to the optical network.

FIG. 1 is a block diagram illustrating a network 10, in accordance with one or more techniques of this disclosure. For purposes of illustration, the example implementations described in this disclosure are described in context of an optical network (e.g., a passive optical network (PON)). Accordingly, network 10 may be referred to as PON 10. However, aspects of this disclosure are not so limited, and can be extended to other types of networks such as cable or digital subscriber line (DSL) based networks, or Active Ethernet which may be considered as optical transmission and reception in accordance with the Ethernet protocol. Active Ethernet is defined by the IEEE 802.3ah standard (e.g., in clause 59 of the 802.3ah standard). Examples of network 10 also include shared-medium transports such as Wi-Fi and RF/DOCSIS.

As shown in FIG. 1, PON 10 may deliver voice, data, and video content (generally "information") to a number of network nodes via optical fiber links. In some examples, PON 10 may be arranged to deliver Internet Protocol television (IPTV) and other high speed information (e.g., information transmitted at approximately 200 Mbps or higher). PON 10 may conform to any of a variety of PON standards, such as the broadband PON (BPON) standard (ITU G.983), the 1G Ethernet PON (EPON) standard, the 10G Ethernet PON (EPON) standard, the gigabit-capable PON (GPON) standard (ITU G.984), the 10-gigabit capable PON (XG-PON) standard (ITU G.987), or the 40-gigabit capable PON (NG-PON2) standard (ITU-T G.989) as well as future PON standards under development by the Full Service Access Network (FSAN) Group, ITU, IEEE, and other organizations.

The ITU-T B-PON G.983 standard is described in Recommendation ITU-T G.983.2, Series G: Transmission Systems and Media, Digital Systems and Networks, Digital sections and digital line system—Optical line systems for local and access networks, "ONT management and control interface for B-PON," 07/2005.

The 1G EPON standard is described in IEEE Standard 802.3ah-2004—IEEE Standard for Information technology—Telecommunications and information exchange between systems—Local and metropolitan area networks—Specific requirements—Part 3: CSMA/CD Access Method and Physical Layer Specifications Amendment: Physical Layer Specifications and Management Parameters.

The 10G EPON standard is described in IEEE Standard 802.3av-2009—IEEE Standard for Information technology—Local and metropolitan area networks—Specific requirements—Part 3: CSMA/CD Access Method and Physical Layer Specifications Amendment 1: Physical Layer Specifications and Management Parameters for 10 Gb/s Passive Optical Networks.

The ITU-T GPON G.984 standard is described in Recommendation ITU-T G.984.1, Series G: Transmission Systems and Media, Digital Systems and Networks, Digital sections and digital line system—Optical line systems for local and access networks, "Gigabit-capable passive optical networks (GPON): General characteristics," 03/2008.

The ITU-T XG-PON G.987 standard is described in Recommendation ITU-T G.987, Series G: Transmission Systems and Media, Digital Systems and Networks, Digital sections and digital line system—Optical line systems for local and access networks, "10-Gigabit-capable passive optical network (XG-PON) systems: Definitions, abbreviations and acronyms," 06/2012.

The ITU-T G.989 standard is described in Recommendation ITU-T G.989.1, Series G: Transmission Systems and Media, Digital Systems and Networks, Digital sections and digital line system—Optical line systems for local and access networks, "40-Gigabit-capable passive optical networks (NG-PON2): General requirements, 03/2013.

Optical line terminal (OLT) 12 may receive voice information, for example, from the public switched telephone network (PSTN) 14 via a switch facility 16. In addition, OLT 12 may be coupled to one or more Internet service providers (ISPs) 18 via the Internet and a router 20. As further shown in FIG. 1, OLT 12 may receive video content 22 from video content suppliers via a streaming video headend 24. Video also may be provided as packet video over the Internet. In each case, OLT 12 receives the information, and distributes it along optical fiber link 13 to optical splitter/combiner 26. For purposes of this disclosure, switch facility 16, router 20, and streaming video headend 24 may be collectively referred to as upstream networks 25.

Optical splitter/combiner 26 then distributes the information to network interface devices 28A-28N (collectively referred to as "network interface devices 28") via respective fiber optic links 27A-27N (collectively referred to as "fiber optic links 27"). In some examples, PON 10 includes 128 network interface devices 28; however, the aspects of this disclosure may not be so limited. Also, for purposes of this disclosure, network interface devices 28 may be interchangeably referred to as optical network units (ONUs) or optical network terminals (ONTs). Additionally, for purposes of this disclosure, network interface devices 28 and OLT 12 may be interchangeable referred to as optical network devices (ONDs).

A single network interface device 28 is an example of a network interface device. Other examples of a network interface device include, but are not limited to, a cable modem or a DSL modem. However, for purposes of illustration but without limitation, the example implementations described in the disclosure are described in the context of the network interface device being an ONU or ONT.

Each one of network interface devices 28 may reside at or near a subscriber premises that includes one or more subscriber devices 30A-30N (collectively referred to as "subscriber devices 30"). For instance, network interface device 28A resides at or near a subscriber premises that includes one or more subscriber devices 30A, and network interface device 28N resides at or near a subscriber premises that includes one or more subscriber devices 30N. The subscriber premises may be a home, a business, a community or government center, an industrial plant, a school, or the like. A single network interface device 28 may be capable of transmitting information to and receiving information from one or more subscriber premises.

As illustrated, a single network interface device 28 may directly transmit information to or receive information from one or more subscriber devices 30 within the subscriber premises. Examples of the subscriber devices 30 include, but are not limited to, one or more computers (e.g., laptop and desktop computers), network appliances, televisions, game consoles, set-top boxes, wireless devices, media players, or the like, for video and data services, and one or more telephones for voice services. Subscriber devices 30 may also include household appliances such as furnaces, washer and dryers, freezers, refrigerators, thermostats, lights, security systems, and the like.

OLT 12 transmits downstream information to and receives upstream information from network interface devices 28 via fiber link 13 coupled to splitter/combiner 26. Downstream information may be considered to be information transmitted by OLT 12 and received by network interface devices 28. Upstream information may be considered to be information transmitted by each one of network interface devices 28 and received by OLT 12. As illustrated in FIG. 1, optical splitter/combiner 26 may be coupled to each one of network interface devices 28 via respective optical fiber links 27.

In some examples, optical splitter/combiner 26 may be a passive splitter/combiner. A passive splitter/combiner may not need to be powered. For downstream transmission, including voice, video, and data information from OLT 12, optical splitter/combiner 26 receives the downstream information and splits the downstream information for downstream transmission to network interface devices 28 via respective fiber links 27 such that all of network interface devices 28 receive the same signal. For upstream information, including voice and data information from each one of network interface devices 28, optical splitter/combiner 26 receives upstream information from network interface devices 28 via respective fiber links 27 and combines the upstream information for transmission to OLT 12.

In some examples, optical splitter/combiner 26 may not be a passive splitter/combiner, but rather an active splitter/combiner. In these examples, optical splitter/combiner 26 may be powered locally. In these examples, optical splitter/combiner 26 may function as a switch, router, multiplexer, and the like.

Network interface devices 28 receive and transmit information via respective fiber links 27. Also, OLT 12 receives and transmits information via fiber link 13. To differentiate between transmission and reception, each one of network interface devices 28 may be configured to transmit voice and data information with an optical signal with a wavelength of 1310 nanometer (nm), receive voice and data information with an optical signal with a wavelength of 1490 nm, and receive video information with an optical signal with a wavelength of 1550 nm. OLT 12 may be configured to receive voice and data information with an optical signal with a wavelength of 1310 nm, transmit voice and data information with an optical signal with a wavelength of 1490 nm, and transmit video information with an optical signal with a wavelength of 1550 nm. These wavelengths are provided merely as examples.

The specific transmit and receive wavelengths indicated above are provided for illustration purposes only. In different examples, network interface devices 28 and OLT 12 may be configured to transmit and receive information with optical signals at different wavelengths than those provided above. However, the transmission and reception wavelengths of the optical signals should be different.

Each one of network interface devices 28 may be configured to transmit upstream information according to time division multiple access (TDMA) techniques. For instance, as discussed above, OLT 12 may grant or assign to each of subscriber devices 30 certain timeslots during which to transmit upstream information. Each one of network interface devices 28 transmits information to OLT 12 based on the timeslots assigned to each of respective subscriber devices 30. The timeslot for each one network interface devices 28 may be different. In this manner, each one of network interface devices 28 may transmit information without collision of information from two or more different network interface devices 28 at splitter/combiner 26. Collision of information may occur if splitter/combiner 26 receives upstream information from two or more network interface devices 28 at the same time.

As one example of the TDMA techniques, when one of network interface devices 28 (e.g., network interface device 28A), is powered on for the first time, OLT 12 may perform an auto-ranging process, as is well known in the art. For instance, during the auto-ranging process, OLT 12 may calculate the total propagation delay (e.g., the total time it takes to transmit information to network interface device 28A and receive information from network interface device 28A). OLT 12 may perform similar auto-ranging process on each one of network interface devices 28.

After the auto-ranging process, OLT 12 may calculate an equalization delay for each one of network interface devices 28, utilizing techniques well known in the art. The equalization delay equalizes the propagation delay of each one of network interface devices 28, relative to the other network interface devices 28. OLT 12 may transmit the equalization delay to each one of network interface devices 28 utilizing a physical layer operations and maintenance (PLOAM) message or utilizing an ONU management control interface (OMCI) message.

Once all the equalization delays are calculated and transmitted to network interface devices 28, OLT 12 may grant the timeslots during which each one of network interface devices 28 should transmit data (e.g., an optical signal). OLT 12 may transmit a bandwidth map to each one of network interface devices 28 indicating the timeslots during which each one network interface devices 28 should transmit data. OLT 12 may transmit the bandwidth map utilizing a PLOAM or OMCI message, or other message. In this way, PON 10 utilizes time division multiplexing to precisely synchronize transmission from all ONTs (e.g., network interface devices 28) such that each ONT transmits during a window where all other ONTs are quiet.

However, because PON 10 is a shared medium for network interface devices 28, PON 10 may be susceptible to network outages due to a single misbehaved (e.g., malfunctioning) network interface device 28. For example, although each one of network interface devices 28 should output an optical signal representing the data received from respective subscriber devices 30 during its assigned timeslot, a malfunctioning network interface device 28 may transmit an optical during a timeslot to which it is not assigned.

For instance, each one of network interface devices 28 includes a controller, such as a media access control (MAC) controller, that instructs a laser driver to turn on the laser (e.g., energize the laser) during its assigned timeslot and to turn off the laser (e.g., de-energize the laser) during timeslots to which it is not assigned. In the techniques described in this disclosure, one of network interface devices 28 whose laser becomes energized outside the control of its controller is referred to as a rogue network interface device. For example, if the controller instructs the laser driver to turn off the laser, but the laser does not turn off, the laser may be considered as being energized outside the control of its controller (e.g., the laser driver is non-responsive to the instructions from the controller to turn off the laser).

The existence of a rogue network interface device in PON 10 may be a significant failure mode of PON 10. For example, the optical signal transmission from the rogue network interface device falls outside the allowed timeslots and is sent coincidentally with the proper transmission from other ones of network interface devices 28. For example, network interface device 28A may be assigned a first timeslot in which to transmit an optical signal, and network interface device 28N may be assigned a second timeslot in which to transmit an optical signal. If network interface device 28A were a rogue network interface device, network interface device 28A may transmit an optical signal during the first timeslot, which will be data from subscriber devices 30A. In addition, network interface device 28A may transmit an optical signal during the second timeslot which coincides, and hence collides, with the optical signal of network interface device 28N, which will be data from subscriber devices 30N.

In this case, the optical signal outputted by network interface device 28A during the second timeslot (e.g., the timeslot to which network interface device 28A is not assigned) may be a noisy optical signal with random optical ones and zeros and not at a fixed data rate. This noisy optical signal from network interface device 28A mixes with optical signal from network interface device 28N in the second timeslot resulting in the inability of OLT 12 to properly reconstruct the data transmitted by subscriber devices 30N via network interface device 28N in the second timeslot (e.g., causing recovery issues at OLT 12). For example, there may be a significant number of bit-errors in the reconstructed data transmitted by subscriber devices 30N via network interface device 28N in the second timeslot.

In accordance with one or more techniques of this disclosure, an OND (e.g., OLT 12 or one or more of network interfaces 28) may be configured to output a representation of physical layer data of PON 10. As one example, OLT 12 may output a representation of an optical signal on fiber link 13. As another example, a particular network interface of network interfaces 28 may output a representation of an optical signal on a respective fiber link of fiber links 27.

In some examples the OND may output the representation of the optical signal to one or more of upstream networks 25. As one example, OLT 12 may output the representation directly to one or more of upstream networks 25. As another example, a network interface device of network interface devices 28 may output the representation to one or more of upstream networks 25 via OLT 12. In this way, the network interface device of network interface devices 28 may enable one or more of upstream networks 25 to analyze the physical layer data on the respective fiber link of fiber links 27 without needing direct physical access to the fiber link.

In some examples, the OND may encapsulate the representation of the physical layer data. For instance, the OND may encapsulate the representation by generating one or more frames that include the representation of the physical layer data. In some examples, the frames generated by the OND may be a frame type receivable by one or more of upstream networks 25 (e.g., an Ethernet frame type). In some examples, such as where the representation of the physical layer data is larger than a payload size of the frame type receivable by one or more of upstream networks 25, the OND may segment the representation of the physical layer data into a plurality of segments which may then be framed and output to one or more of upstream networks 25. In addition to the representation of the physical layer data, the OND may include contextual information in the generated frames. Further details of the contextual information are provided below with reference to FIG. 6.

In any case, one or more of upstream networks 25 may receive the representation of the physical layer data of the optical network. The representation may then be analyzed to determine the presence or absence of one or more failure modes of PON 10. In this way, OLT 12 and/or one or more of network interface devices 28 may enable the analysis of the physical layer data of PON 10 without requiring the attachment of an additional device to PON 10.

Figure 2A:
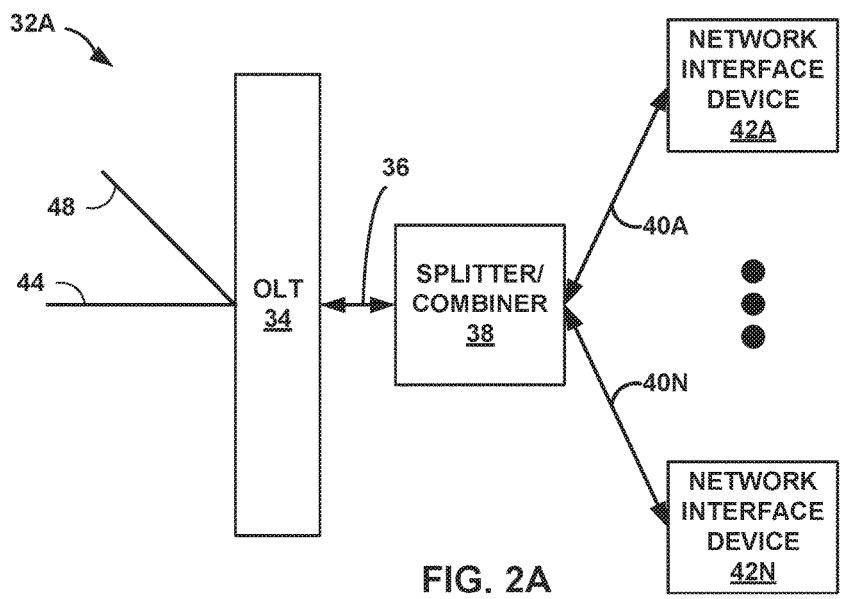
FIGS. 2A and 2B are block diagrams illustrating example network analysis configurations, in accordance with the techniques of this disclosure.
Figure 2B:
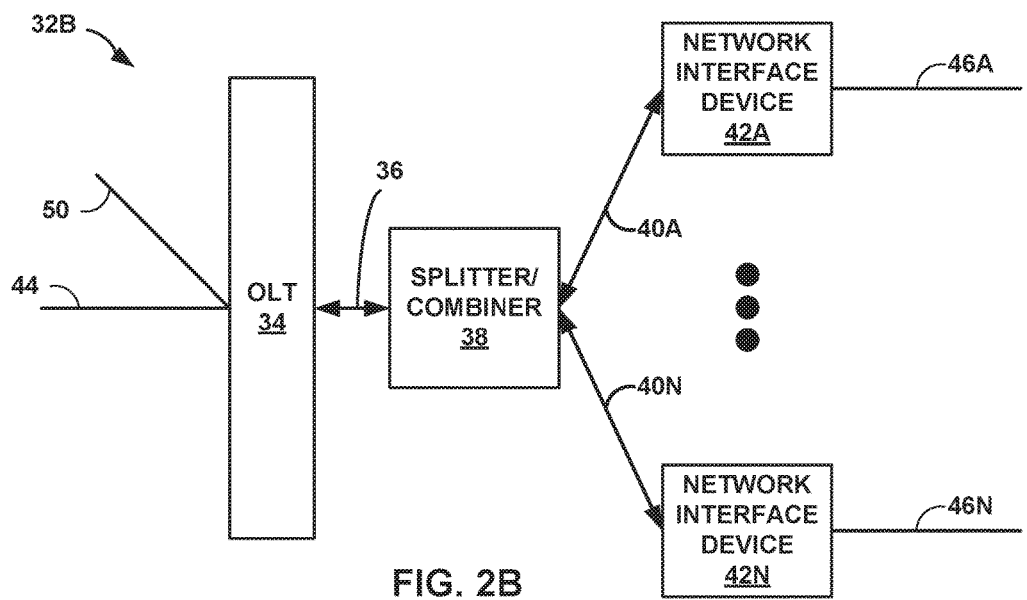

FIGS. 2A and 2B are block diagrams illustrating example network analysis configurations, in accordance with the techniques of this disclosure. Networks 32A and 32B of FIGS. 2A and 2B may be examples of network 10 of FIG. 1. As illustrated in FIGS. 2A and 2B, networks 32A and 32B may each include OLT 34, fiber link 36, splitter/combiner 38, one or more fiber links 40 (collectively, "fiber links 40"), and one or more network interface devices 42A-42N (collectively, "network interface devices 42").

OLT 34, fiber link 36, splitter/combiner 38, fiber links 40, and network interface devices 42 may respectively be examples of OLT 12, fiber link 13, splitter/combiner 26, fiber links 27, and network interface devices 28 of FIG. 1. For instance, responsive to receiving downstream data from its upstream network, OLT 34 may output an optical signal that represents the downstream data to splitter/combiner 38 via fiber link 36. Splitter/combiner 38 may distribute the optical signal to network interface devices 42 via fiber links 40. The network interface device of network interface devices 42 to which the downstream data is addressed may output the downstream data as network traffic 46 to its corresponding downstream network. Similarly, responsive to receiving upstream data, a respective network interface device of network interface devices 42 may output an optical signal that represents the upstream data to splitter/combiner 38 via a respective fiber link of fiber links 40. Splitter/combiner 38 may distribute the optical signal to OLT 34 which may output the upstream data as network traffic 44 to the upstream network of OLT 34.

In some examples, it may be desirable to monitor the data flowing through an optical network, e.g., for analysis. As one example, it may be desirable to monitor network traffic as it enters and exits a network interface of OLT 34 (e.g., an Ethernet interface). In accordance with one or more techniques of this disclosure and as illustrated in FIG. 2A, where network traffic 44 enters and exits a first network interface of OLT 34, OLT 34 may be configured to facilitate the monitoring of data flowing through optical network 32A by outputting, on a second network interface of OLT 34, mirrored network traffic 48 that corresponds to network traffic 44 at the first network interface of OLT 34. In this way, OLT 34 may enable analysis of the network traffic entering and/or exiting an upstream interface of OLT 34. In some examples, the above operations may be an example of the use of a switched port analyzer (SPAN).

As another example, it may be desirable to monitor network traffic as it enters and exits a network interface of a network interface device of network interface devices 42 (e.g., an Ethernet interface). In accordance with one or more techniques of this disclosure and as illustrated in FIG. 2B, as network traffic 46A enters and exits a network interface of network interface device 42A, network interface device 42A may be configured to facilitate the monitoring of data flowing through optical network 32B by outputting, back through PON 10B for output at a network interface of OLT 34, mirrored network traffic 50 that corresponds to network traffic 46A at the network interface of network interface device 42A. In this way, network interface device 42A may enable remote analysis of the network traffic entering and/or exiting a downstream interface of network interface device 42A. In some examples, the above operations may be an example of the use of a remote switched port analyzer (RSPAN).

As discussed above, it may be desirable to monitor physical layer data of PON 10A. However, while the above operations may enable analysis of one or both of the network traffic entering and/or exiting an upstream interface of OLT 34 and the network traffic entering and/or exiting a downstream interface of network interface device 42A, they fail to enable the monitoring/analysis of physical layer data of either PONs 10A or 10B.

Figure 3:
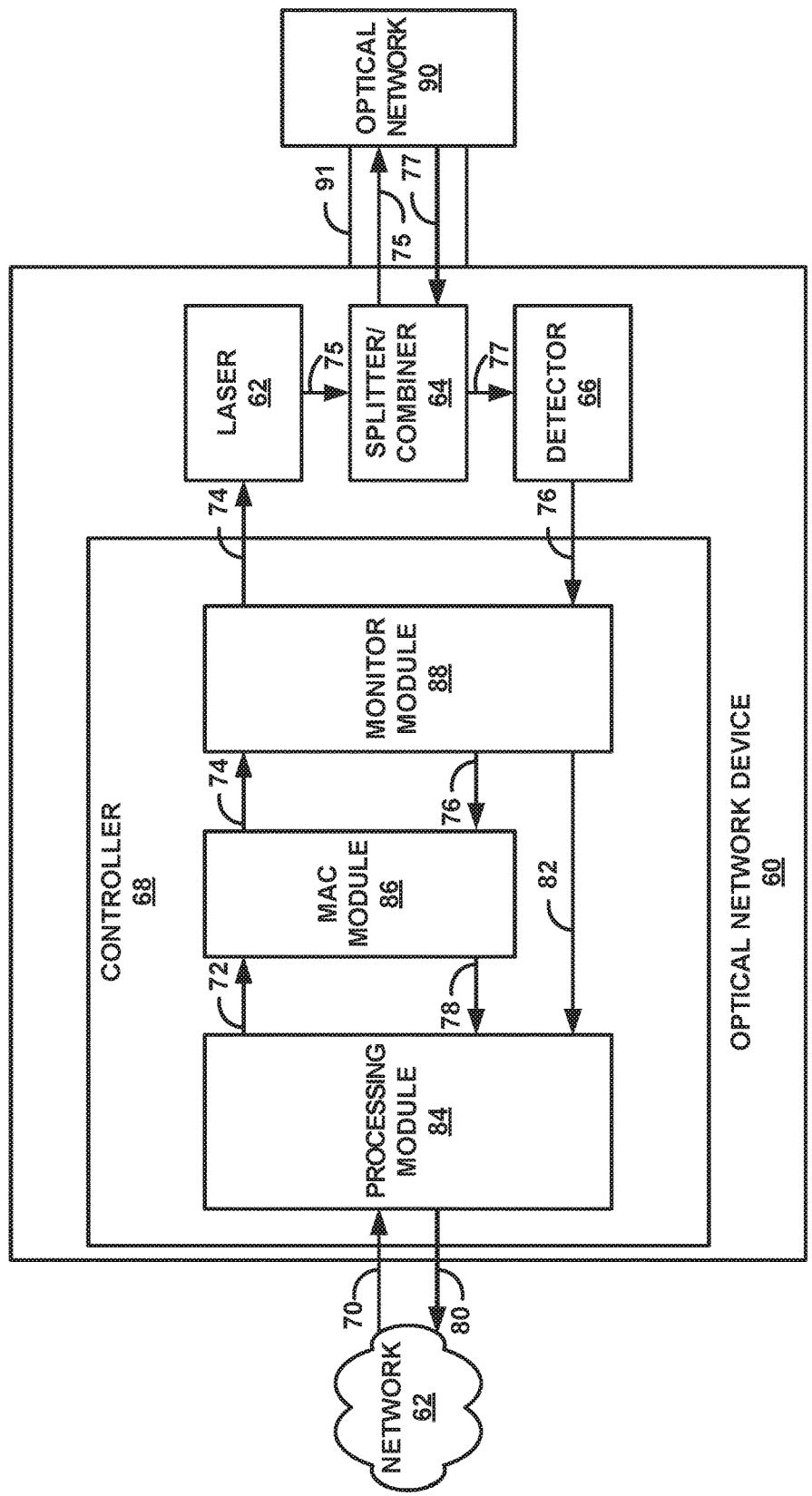
FIG. 3 is a block diagram illustrating an example of an optical network device (OND) in accordance with the techniques of this disclosure.

FIG. 3 is a block diagram illustrating an example of an optical network device (OND) in accordance with the techniques of this disclosure. As discussed above, an OND may be either an ONU, or an OLT. As such, OND 60 may be an example of an optical line terminal (OLT), such as OLT 12 of FIG. 1, or an optical network unit (ONU), such as one of network interface devices 28 of FIG. 1. As illustrated in FIG. 3, OND 60 may be coupled to and exchange data with both network 62 and optical network 90. As one example, OND 60 may receive ingress data 70 from network 62 and output egress data 80 to network 62. As another example, OND 60 may receive ingress optical signal 77 (representing ingress data 76) from optical network 90 and output egress optical signal 75 (representing egress data 74) to optical network 90. Where OND 60 is an ONU, network 62 may be referred to as a subscriber network. As illustrated in FIG. 3, OND 60 may include, laser 62, splitter/combiner 64, detector 66, and controller 68.

In some examples, OND 60 may include laser 62 which may be configured to output an optical signal based on a signal received from controller 68. For instance, laser 62 may output egress optical signal 75 based on egress data 74 to fiber link 91 of optical network 90, e.g., via splitter combiner 64. In some examples, laser 62 may be positioned externally with reference to OND 60 and may be operatively coupled via one or more electrical connectors.

In some examples, OND 60 may include splitter/combiner 64 which may be configured to optically couple a plurality of devices. For instance, splitter/combiner 64 may optically couple the output of laser 62 (e.g., egress optical signal 75) to fiber link 91, and the output of fiber link 91 (e.g., ingress optical signal 77) to detector 66.

In some examples, OND 60 may include detector 66 which may be configured to convert a received optical signal into an electrical signal. For instance, detector 66 may be configured to convert ingress optical signal 77 into ingress data 76 (which may be an electrical representation of ingress optical signal 77), and output ingress data 76 to controller 68. In some examples, detector 66 may be positioned externally with reference to OND 60 and may be operatively coupled via one or more electrical connectors.

In some examples, OND 60 may include controller 68 which may be configured to manage communications between an external network, such as network 62, and an optical network, such as optical network 90. As one example, controller 68 may receive ingress data 70 from network 62 and output corresponding egress data 74 to optical network 90 in the form of output optical signal 75. As another example, controller 68 may receive ingress data 76 from optical network 90 in the form of input optical signal 77 and output corresponding egress data 80 to network 62. As illustrated in the example of FIG. 3, controller 68 may include processing module 84, media access control (MAC) module 86, and monitor module 88.

In some examples, controller 68 may include processing module 84 which may be configured to perform one or more functions to facilitate communication between network 62 and optical network 90. For instance, processing module 84 may manipulate, replicate, drop, and/or forward traffic received from network 62. As one example, interface module 84 may process ingress data 70 to determine intermediate data 72. For instance, where ingress data 70 is in the form of Ethernet data, such as an Ethernet frame, processing module 84 may encapsulate the Ethernet data into one or more frames, such as GPON encapsulation method (GEM) frames, and forward the one or more frames to MAC module 86 as intermediate data 72. In some examples, processing module 84 may encapsulate ingress data 70 into intermediate data 72 in accordance with the ITU G.984.3 standard.

As another example, processing module 84 may process intermediate data 78 to generate egress data 80 for output to network 62. For instance, where intermediate data 78 is in the form of one or more frames, such as GEM frames, processing module 84 may decapsulate the one or more frames to determine egress data 80 which may be in the form of Ethernet data, such as one or more Ethernet frames, and output egress data to network 62. In some examples, processing module 84 may decapsulate intermediate data 78 into egress data 80 in accordance with the ITU G.984.3 standard. In some examples, processing module 84 may perform one or more media access control (MAC) operations with respect to network 62.

In some examples, controller 68 may include MAC module 86, which may be configured to manage the interface between OND 60 and optical network 90. For instance, MAC module 86 may prepare intermediate data 72 for transmission over optical network 90 and/or perform one or more operations to facilitate the management of optical network 90.

In some examples, MAC module 86 may package intermediate data 72 for transmission over optical network 90 by encapsulating intermediate data 72 into one or more frames compatible with optical network 90, such as one or more PON frames (e.g., one or more GTC (Gigabit-capable passive optical network Transmission Convergence) frames in accordance with the ITU G.984.3 standard). For instance, where intermediate data 72 includes GEM frames, MAC module 86 may generate egress data 74 by combining one or more of the GEM frames into a PON frame.

In some examples, in addition to or in place of the GEM frames (which may be considered payload data), MAC module 86 may include management information in the generated PON frames. As one example, where OND 60 is an OLT, the PON management information may include physical synchronization data, identification data, physical layer operations administration and maintenance (PLOAM) data, parity data (e.g., bit interleaved parity data), payload length data, and/or bandwidth map data. As another example, where OND 60 is an ONU, the PON management information may include parity data (e.g., bit interleaved parity data), an identification of the ONU, ONU status data, physical layer operations administration and maintenance (PLOAM) data, and/or dynamic bandwidth data. In any case, MAC module 86 may output the egress data 74 to one or more other components of OND 60, such as laser 62 and/or monitor module 88, to cause at least one of the other components to output egress optical signal 75 as a representation of egress data 74. In this way, MAC module 86 may cause additional data (i.e., data other than ingress data 70) to be transmitted via optical network 90.

In some examples, controller 68 may include monitor module 88 which may be configured to monitor and mirror some or all of the data flowing between MAC module 86 and optical network 90. As one example, such as when OND 60 is outputting egress data 74/egress optical signal 75, monitor module 88 may generate mirrored data 82 based on egress data 74. As another example, such as where OND 60 is receiving ingress optical signal 77/ingress data 76, monitor module 88 may generate mirrored data 82 based on ingress data 76. In other words, monitor module 88 may be configured to generate mirrored data 82 based on an optical signal generated by laser 62.

In addition to monitoring, monitor module 88 may allow data to pass, unchanged, between components of OND 60. For instance, monitor module 88 may pass egress data 74 received from MAC module 86 to laser 62 and ingress data 76 received from detector 66 to MAC module 86.

Figure 4:
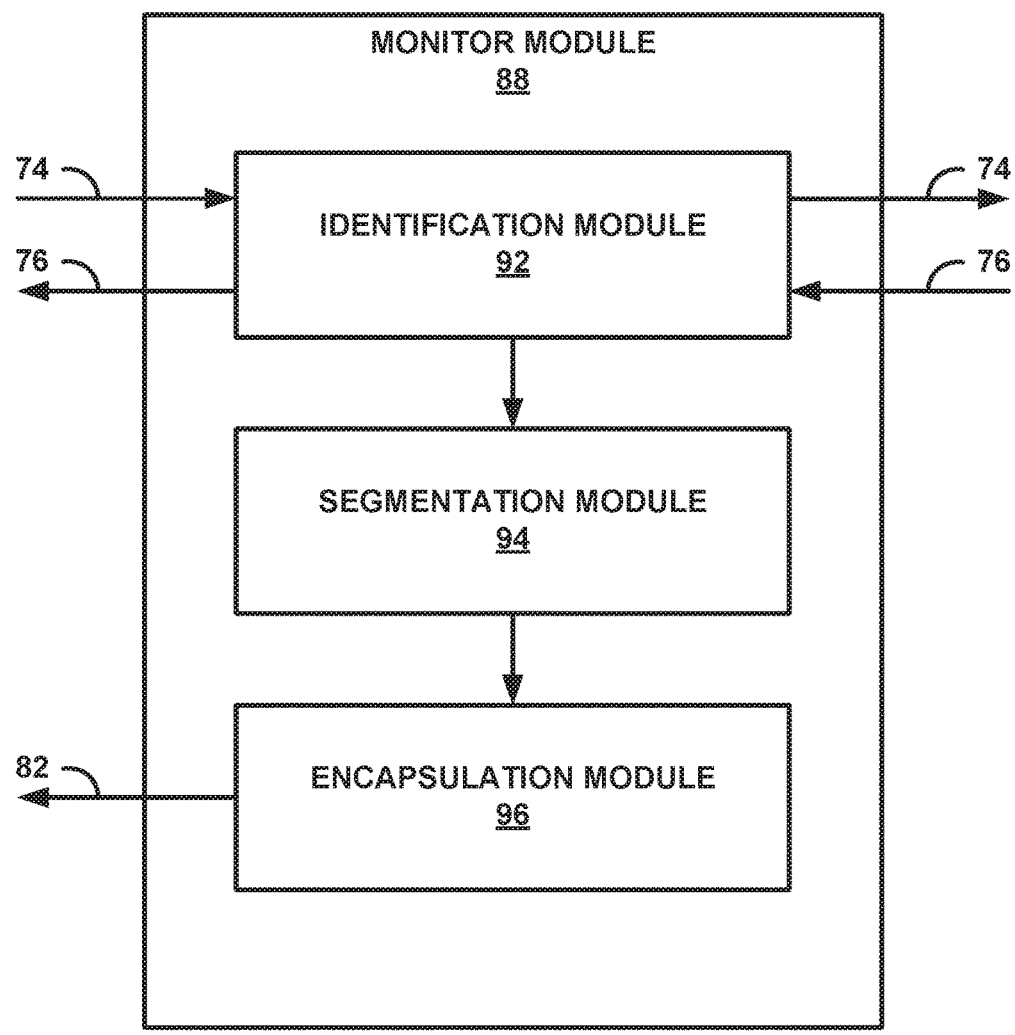
FIG. 4 is a block diagram illustrating further details of monitor module 88 of FIG. 3, in accordance with the techniques described in this disclosure.

FIG. 4 is a block diagram illustrating further details of monitor module 88 of FIG. 3, in accordance with the techniques described in this disclosure. As illustrated in FIG. 4, monitor module 88 may include identification module 92, segmentation module 94, and encapsulation module 96.

In some examples, monitor module 88 may include identification module 92 may be configured to determine which portions of the data flowing between a MAC module and an optical network, such as MAC module 86 and optical network 90 of FIG. 3, should be captured. For instance, identification module 92 may determine which portions of ingress data 76 and/or egress data 74 (i.e., physical layer data) should be captured. The physical layer data of may be "raw data" sampled from one or more points within OND 60. As one example, the physical layer data may be recovered data (i.e., ingress data 76 after down sampling). As another example, the physical layer data may be recovered oversampled data (i.e., ingress data 76 without down sampling). As another example, the physical layer data may be transmitted data (i.e., egress data 74). As another example, the physical layer data may be transmitted data pre-scrambler (i.e., egress data 74 pre-scrambler). As another example, the physical layer data may be transmitted data pre-forward error correction (FEC) (i.e., egress data 74 pre-FEC). As another example, the physical layer data may be transmitted data pre-advanced encryption standard (AES) (i.e., egress data 74 pre-AES).

In some examples, identification module 92 may determine which portions of the data should be captured based on one or more trigger conditions. Some example trigger conditions may include, but are not limited to, parity errors (e.g., BIP8 errors), rogue events, data indicated by the data (e.g., specific PLOAM messages, addresses), signal detect, manual, and performance issues. In some examples, the presence or absence of a trigger condition may be based on one or both of ingress data 76 and egress data 74. In some examples, in order to determine the presence or absence of a trigger condition, identification module 92 may capture a frame of data (e.g., a PON frame), and determine whether the frame of the data satisfies one or more of the trigger conditions. In any case, responsive to identifying a particular portion of ingress data 76 and/or egress data 74 for capture, identification module 92 may capture the particular portion and provide it to one or more other components of OND 60, such as segmentation module 94.

In some examples, monitor module 88 may include segmentation module 94 which may be configured to determine one or more segments based on a received block of data. For instance, segmentation module 94 may determine one or more segments that each include a portion of the data identified by and received from identification module 92. In some examples, such as where the data identified by and received from identification module 92 is a PON frame that includes 38880 bytes of data, segmentation module 92 may divide the PON frame into 32 segments that each include 1215 bytes of the data. In any case, segmentation module 94 may provide the one or more segments to one or more other components of OND 60, such as encapsulation module 96.

In some examples, monitor module 88 may include encapsulation module 96 which may be configured to generate mirrored data 82 by encapsulating one or more segments of data, e.g., into one or more frames. For instance, encapsulation module 96 may encapsulate particular segments received from segmentation module 94 into a frame by appending contextual information. Examples of contextual information include, but are not limited to, a location of the portion of the representation of the physical layer data included in the particular segment within a frame of the optical network, a trigger condition that caused identification module 92 to capture the representation of the physical layer data included in the particular segment, and sampling information. In some examples, encapsulation module 96 may encapsulate the one or more segments of data into one or more Ethernet frames. In any case, encapsulation module 96 may output the encapsulated segments of data as mirrored data 82 to one or more other components of OND 60, such as processing module 84. In this way, monitor module 88 may enable the monitoring and mirroring of some or all of the data flowing between MAC module 86 and optical network 90.

Referring now to FIGS. 3-4, monitoring module 88 may monitor and/or mirror of some or all of the data flowing between MAC module 86 and optical network 90. As one example, monitoring module 88 may monitor and/or mirror of some or all of the data outputted by OND 60 to optical network 90. As another example, monitoring module 88 may monitor and/or mirror of some or all of the data received by OND 60 from optical network 90.

As discussed above, monitoring module 88 may monitor and/or mirror of some or all of the data outputted by OND 60 to optical network 90. In operation, processing module 84 may process ingress data 70 received from network 62 to generate intermediate data 72. For example, processing module 84 may receive Ethernet data, such as an Ethernet packet or and Ethernet frame, from network 62 and encapsulate the Ethernet data into one or more frames, such as GPON encapsulation method (GEM) frames, to generate intermediate data 72. In some examples, processing module 84 may encapsulate ingress data 70 into intermediate data 72 in accordance with the ITU G.984.3 standard.

MAC module 86 may prepare intermediate data 72 for transmission over optical network 90. For instance, where intermediate data 72 includes GEM frames, MAC module 86 may generate egress data 74 by combining one or more of the GEM frames into a PON frame. In some examples, in addition to or in place of the GEM frames, MAC module 86 may generate PON frames that include management information. As discussed above, the type of management information that may be included in the PON frames may depend on whether OND 60 is an OLT or an ONU. In any case, responsive to determining that OND 60 has rights to transmit on optical network 90, MAC module 86 may output egress data 74 to laser 62 such that laser 62 outputs optical egress signal 75 as a representation of egress data 74.

Monitor module 88 may also receive egress data 74 from MAC module 86 and, in accordance with one or more techniques of this disclosure, may generate mirrored data 82 based on some or all of egress data 74. For instance, identification module 92 may determine whether or not to capture and/or store some or all of egress data 74, e.g., based on one or more trigger conditions. In some examples, identification module 92 may capture and store a frame of data (e.g., a PON frame), and determine whether the frame of the data satisfies one or more of the trigger conditions.

In any case, responsive to identifying a particular portion of egress data 74 for capture/storage, identification module 92 may capture/store the particular portion of egress data 74 and provide it to segmentation module 94. As one example, where OND 60 is an OLT and egress data 74 includes a downstream PON frame, identification module 92 may capture the downstream PON frame and provide the downstream PON frame to segmentation module 94. As another example, where OND 60 is an ONU and egress data 74 includes an upstream PON frame, identification module 92 may capture the upstream PON frame and provide the upstream PON frame to segmentation module 94.

Segmentation module 94 may receive the captured portions of egress data 74 and determine one or more segments that each include a portion of the captured data. Additional details of segmentation module 94 are discussed below with reference to FIG. 5. In any case, segmentation module 94 may output the one or more segments to encapsulation module 96.

Encapsulation module 96 may generate mirrored data 82 by encapsulating the one or more segments of data received from segmentation module 94 into one or more frames, such as one or more Ethernet frames. Mirrored data 82 may be considered to be mirrored in the sense that, for example, it includes an exact copy of the captured portions of egress data 74. Encapsulation module 96 may designate a destination address of the frames as the address of a diagnostic device that is to receive mirrored data 82 (e.g., a device that may be utilized to debug optical network 90). In some examples, in addition to the segments of data, encapsulation module 96 may include contextual information corresponding to the segments of data in the generated one or more frames. Additional details of encapsulation module 96 are discussed below with reference to FIGS. 5 and 6. In any event, encapsulation module 96 may output the frames that encapsulate mirrored data 82 to processing module 84.

Processing module 84 may forward the frames that encapsulate mirrored data 82 to the address indicated by the one or more frames. As one example, where the address indicated by a particular frame of mirrored data 82 (i.e., the address of the diagnostic device that is to receive mirrored data 82) is accessible via network 62, processing module 84 may output the particular frame of mirrored data 82 to network 62 as egress data 80 which may be received by the diagnostic device. In this way, OND 60 may output an encapsulated representation of physical layer data of the optical network to another device.

As another example, where the address indicated by a particular frame of mirrored data 82 is accessible via optical network 90, processing module 84 may process the particular frame of mirrored data 82 into GEM frames and output the GEM frames to MAC module 86 for transmission via optical network 90. In this way, OND 60 may output an encapsulated representation of physical layer data of the optical network to another device.

As discussed above, monitoring module 88 may mirror some or all of the data received by OND 60 from optical network 90. In operation, detector 66 may receive, via splitter/combiner 64 and fiber link 91, optical ingress signal 77, convert optical ingress signal 77 into ingress data 76, and output ingress data 76 to MAC module 86. In some examples, ingress data 76 may include a PON frame. Where OND 60 is an OLT, the PON frame may be an upstream frame. Conversely, where OND 60 is an ONU, the PON frame may be a downstream frame.

Monitor module 88 may also receive ingress data 76 from detector module 66 and, in accordance with one or more techniques of this disclosure, may generate mirrored data 82 based on some or all of ingress data 76. In some examples, monitor module 88 may generate mirrored data 82 based on some or all of ingress data 76 using similar techniques to those described above where monitor module 88 generates mirrored data 82 based on some or all of egress data 74. For instance, identification module 92 may determine whether or not to capture and/or store some or all of ingress data 76, e.g., based on one or more trigger conditions. Where identification module 92 captures some of all of ingress data 76, segmentation module 94 may determine one or more segments that each include a portion of the captured data. Encapsulation module 96 may then generate mirrored data 82 by encapsulating the one or more segments of data received from segmentation module 94 into one or more frames and providing the one or more frames to processing module 84. As discussed above, processing module 84 may forward the frames that encapsulate mirrored data 82 to the address indicated by the one or more frames. In this way, OND 60 may output an encapsulated representation of physical layer data of the optical network.

In some examples, OND 60 may be configured to receive ingress data 76 from optical network 90 at a rate that is less than the rate at which OND 60 is configured to output egress data 80 to network 62 (e.g., where OND 60 is an OLT with a 2.5 Gbps uplink to network 62 and a 1.2 Gbps uplink from optical network 90). As such, in some examples, processing module 84 may output mirrored data 82 to network 62 at a rate less than or equal to a difference between the rate at which OND 60 is configured to output egress data 80 to network 62 and the rate at which OND 60 is be configured to receive ingress data 76 from optical network 90 (e.g., 1.2 Gbps). In this way, OND 60 may output mirrored data 82 without requiring additional bandwidth and without interfering with the normal operation of OND 60.

In some examples, there may not be enough bandwidth in the uplink to network 62 for processing module 84 to output mirrored data 82 in real time. For instance, where OND 60 is configured to output egress data 74 to optical network 90 at a rate that is greater than or equal to the rate at which OND 60 is configured to output egress data 80 to network 62, there may not be enough bandwidth for processing module 84 to output mirrored data 82 in real time as it is generated (e.g., where OND 60 is an OLT with a 2.5 Gbps uplink to network 62 and a 2.5 Gbps downlink to optical network 90). OND 60 may address such a bandwidth limitation using in a variety of techniques.

As one example, monitor module 88 may be configured to reduce the size of mirrored data 82 such that a smaller amount of bandwidth is required to output mirrored data 82 to network 62. For instance, monitor module 88 may be configured to capture a partial PON frame (i.e., as opposed to a complete PON frame).

As another example, processing module 84 may implement a queue that may store one or more of the frames that encapsulate mirrored data 82 for output at a later time. In some examples, the queue may be given a "lowest-priority" status (below best-effort data). In some examples, processing module 84 may be configured to prevent monitor module 88 from capturing additional mirrored data 82 until there is space available in the queue. In some examples, the queue may be large enough to store an entire PON frame worth of mirrored data 82. For instance, the queue may be capable of storing at least 41824 bytes of data (e.g., 38880 bytes of PON frame data in thirty-two segments+64 bytes of contextual information for each of the thirty-two segments+16 bytes of Ethernet encapsulation data for each of the thirty-two segments+12 bytes of Inter-frame gap for each of the thirty-two segments). In some examples, responsive to determining that there is enough space available in the queue, processing module 84 may output a signal to monitor module 88 indicating that additional data may be captured.

As discussed above, identification module 92 may determine whether or not to capture and/or store some or all of egress data 74 and/or ingress data 76, e.g., based on one or more trigger conditions. Some example trigger conditions may include, but are not limited to, parity errors (e.g., BIP8 errors), rogue events, data indicated by the data (e.g., specific PLOAM messages, addresses), signal detect, manual, and performance issues. In some examples, the amount and/or manner in which the data is captured and/or stored by identification module 92 may vary based on the trigger condition.

As one example, responsive to determining the presence of an upstream BIP8 error, identification module 92 may sample the 40 byte oversampled data from all bursts from a specific ONU. As another example, responsive to determining the presence of an upstream rogue event, identification module 92 may sample the 40b oversampled data from a specific time in the upstream window while the event is active. As another example, responsive to determining the presence of an upstream miss, identification module 92 may sample the 8b recovered data from the beginning of all bursts from a specific ONU. As another example, responsive to determining the presence of a specific upstream PLOAM, identification module 92 may sample the 8b recovered data for a burst with the specific PLOAM. As another example, responsive to determining the presence of an upstream signal detect, identification module 92 may capture ranging data and/or check if an OIM is "chattering." As another example, identification module 92 may be manually configured to capture data. For instance, certain changes at an ONT, such as optics or provisioning, may not be detectable by an automatic trigger. However, a manual trigger may enable a user of a diagnostic device to quickly look at the recovered data to verify that the received data is as expected. As another example, responsive to determining the presence of a downstream performance issue, identification module 92 may capture data based on any number of selectable issues. Some examples of the selectable issues include, but are not limited to, IPv6, replication, multicast, frame utilization, frame type, etc. As another example, responsive to determining the presence of a downstream GPON frame, identification module 92 may capture data based on number of bandwidth (BW) maps, GPON features (FEC/AES) or PLOAMs. As another example, responsive to determining the presence of a specific AllocID, identification module 92 may capture data corresponding to a specific AllocID or AllocID range, such as by using a longest prefix-match.

As discussed above, identification module 92 may capture data based on any number of selectable issues such as IPv6, replication, multicast, frame utilization, and frame type. It may be desirable to capture data based on replication and multicast because, in some examples, replication and multicast may both interact with the GPON MAC (e.g., MAC Module 86) differently than normal data traffic. In these cases, a different GEM PortID may be placed on the packet or the packet may be sent to multiple ONTs. Replication in particular may be hard to debug in customer networks as a single packet enters the MAC, but many are sent out.

It may be desirable to capture data based on IPv6 because IPv6 multicast messages are treated as broadcast replication. As IPv6 adoption rates increase, the volume of IPv6 traffic may correspondingly increase. The operating system Microsoft Windows 7, for example, defaults to issuing an IPv6 address and will natively send out IPv6 NDP messages to attempt to discover devices on the network.

It may be desirable to capture data based on frame utilization because it may indicate the presence or absence of congestion and/or indicate whether a single ONT is receiving a large burst of data. For instance, where downstream GPON frames are sent at 2.5 Gbps, but ONTs only have a 1G Ethernet port, packet drops may occur if a single ONT receives more data than it can handle. The data captured based on frame utilization may be used to determine if traffic is shaped correctly to prevent such a burst.

It may be desirable to capture data based on frame type because as the use of "jumbo" frames that are larger than GPON can support (GPON supports fragments up to 4096Bytes, Ethernet frames may be in excess of 9016B) increase, there may be a corresponding increase in fragmentation, which data captured based on frame type may help debug.

Figure 5:
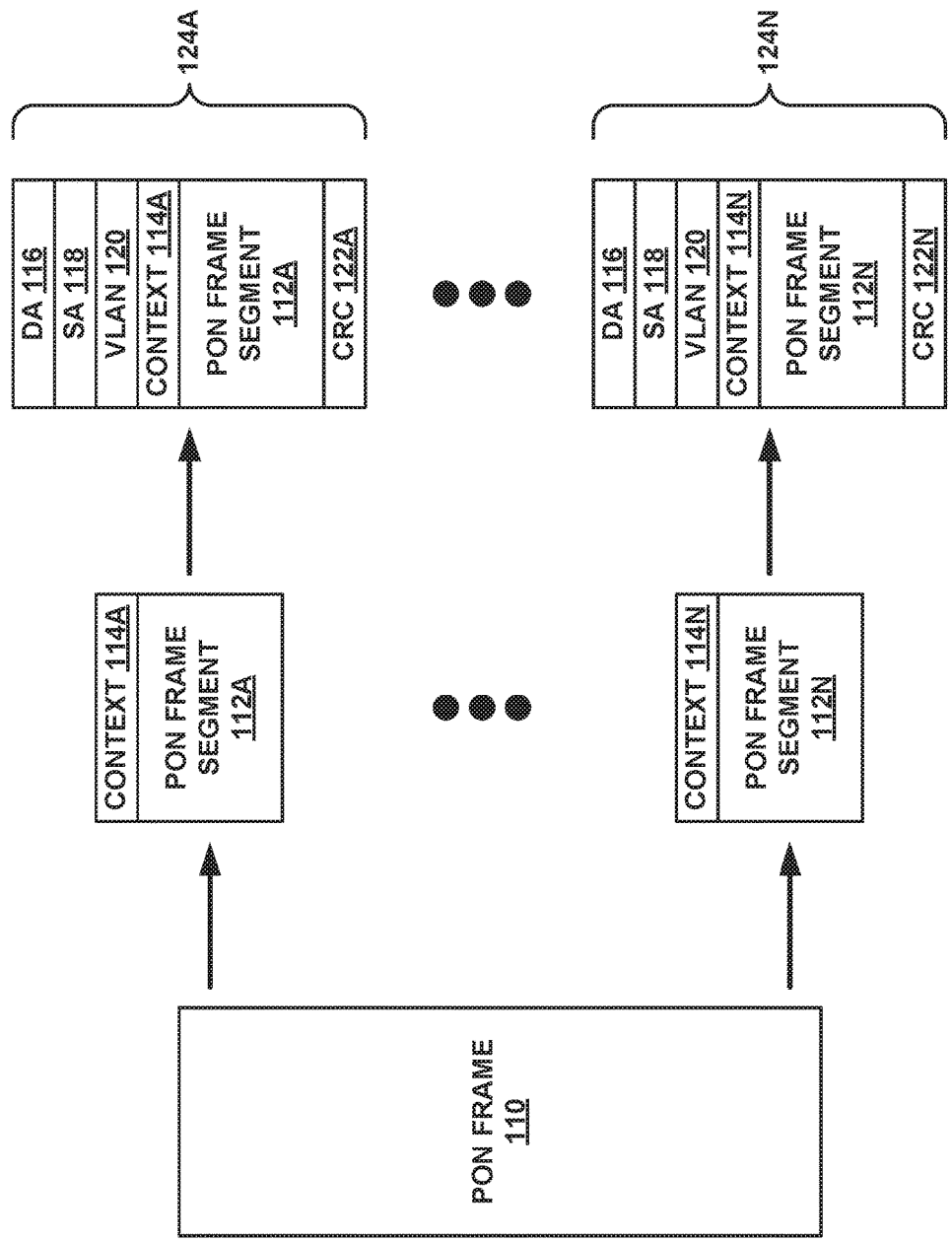
FIG. 5 is a conceptual diagram illustrating example segmentation and encapsulation techniques which may be performed by an optical network device (OND) to generate an encapsulated representation of physical layer data of an optical network, in accordance with one or more techniques of this disclosure.

FIG. 5 is a conceptual diagram illustrating example segmentation and encapsulation techniques which may be performed by an optical network device (OND) to generate an encapsulated representation of physical layer data of an optical network, in accordance with one or more techniques of this disclosure. The techniques of FIG. 5 may be performed by an OND, such as OND 60 illustrated in FIG. 3. For purposes of illustration, the techniques of FIG. 5 are described within the context of OND 60 illustrated in FIG. 3, although optical network devices having configurations different than that of OND 60 may perform the techniques of FIG. 5.

In accordance with one or more techniques of this disclosure, segmentation module 94 of monitor module 88 of OND 60 may receive PON frame 110 from one or more other components of OND 60, such as identification module 92. In some examples, PON frame 110 may be a downstream PON frame. As one example, where OND 60 is an OLT, PON frame 110 may be a downstream PON frame captured by identification module 92 from egress data 74. As another example, where OND 60 is an ONU, PON frame 110 may be a downstream PON frame captured by identification module 92 from ingress data 76. In some examples, PON frame 110 may be an upstream PON frame. As one example, where OND 60 is an OLT, PON frame 110 may be an upstream PON frame captured by identification module 92 from ingress data 76. As another example, where OND 60 is an ONU, PON frame 110 may be an upstream PON frame captured by identification module 92 from egress data 74.

Monitor module 88 may receive PON frame 110 by sampling data. In some examples, to sample data OND 60 may generate a plurality of samples for each bit of the data. OND 60 may down-sample the plurality of samples to determine the value of each bit of the data. For example, where OND 60 generates four "0" samples and one "1" sample for a particular bit, OND 60 may determine the value of the particular bit as "0." The fact that there was a "1" sample may not be indicated by the down-sampled data. However, reviewing the oversampled data may provide insight into the quality of the optics on the optical network. For instance, if the oversampled data only shows three bits of data for each recovered data bit, it could indicate that a laser of the transmitting OND is not operating correctly. As such, in some examples, monitor module 88 may provide segmentation module 94 with oversampled data that corresponds to PON frame 110.

In any case, segmentation module 94 may determine a plurality of segments that may each include a portion of PON frame 110. As illustrated in FIG. 5, segmentation module 94 may determine the plurality of segments by dividing PON frame 110 into PON frame segments 112A-112N (collectively, "PON frame segments 112"). As one example, such as where OND 60 is an OLT and PON frame 110 is a downstream PON frame that contains 38880 bytes of data, segmentation module 92 may divide PON frame 110 into thirty-two of PON frame segments 112 that each include 1215 bytes of the data. As another example, such as where OND 60 is an ONU and PON frame 110 is an upstream PON frame that contains up to 19440 bytes of upstream data and up to 19440 bytes of associated data, segmentation module 92 may divide PON frame 110 into thirty-two of PON frame segments 112 that each include 1215 bytes of the combined upstream and oversampled data. As another example, such as where OND 60 is an ONU and PON frame 110 includes oversampled data (i.e., up to 97000 bytes of five-times oversampled data and up to 19440 bytes of associated data), segmentation module 92 may divide PON frame 110 into up to ninety-six of PON frame segments 112 that each include a portion of the combined upstream and oversampled data (e.g., ninety-five of PON frame segments 112 that include 1215 bytes of the combined data and one of PON frame segments 112 that includes 1012 bytes of the combined data). In any case, segmentation module 94 may output PON frame segments 112 to one or more other components of OND 60, such as encapsulation module 96.

Encapsulation module 96 may encapsulate PON frame segments 112 into one or more frames 124A-124N (collectively, "frames 124"). In some examples, each of frames 124 may include at least one of PON frame segments 112 along with additional information. For instance, each of frames 124 may include one or more of destination address 116 which may indicate a network address of a device intended to receive frames 124, source address 118 which may indicate a network address of OND 60, virtual local area network (VLAN) data 120 which may indicate a VLAN to which the frame belongs (i.e., in accordance with IEEE 802.1Q), and data integrity information 122 (e.g., cyclic-redundancy check or CRC data). In some examples, each of frames 124 may be an Ethernet frame (i.e., in accordance with IEEE 802.3).

In some examples, one or more of frames 124 may also include a respective one of contextual information 114A-114N (collectively, "contextual information 114") that corresponds to a PON frame segment encapsulated by the frame. For instance, frame 124A may include contextual information 114A which may correspond to PON frame segment 112A. In some examples, the contextual information may indicate one or more of a location of the portion of the representation of the physical layer data included in the particular segment within the frame of the optical network, a trigger condition that caused identification module 92 to store the representation of the physical layer data included in the particular segment, and sampling information for the physical layer data. Further details of examples of contextual information are discussed below with reference to FIG. 6. In any case, encapsulation module 96 may provide frames 124 to one or more other components of OND 60, such as processing module 84.

Figure 6:
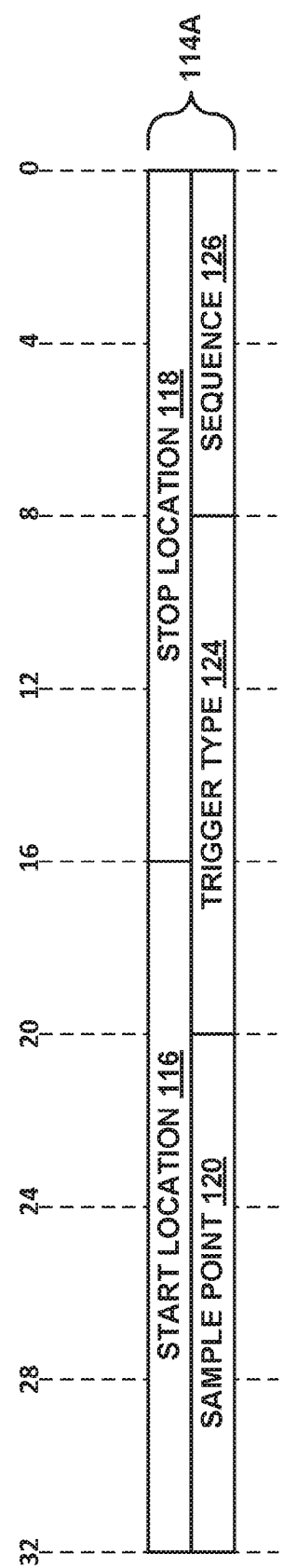
FIG. 6 is a conceptual diagram illustrating an example data structure format for contextual information which may be included in an encapsulated representation of physical layer data of an optical network output by an optical network device (OND), in accordance with one or more techniques of this disclosure.

FIG. 6 is a conceptual diagram illustrating an example data structure format for contextual information which may be included in an encapsulated representation of physical layer data of an optical network output by an optical network device (OND), in accordance with one or more techniques of this disclosure. For purposes of illustration, the contextual information of FIG. 6 is described with reference to PON frame segment 112A; however, it is understood that an OND may include respective contextual information for each of PON frame segments 112. As illustrated by FIG. 6, contextual information 114A may be organized into two 32 bit data words where a first data word may include start location 116 and stop location 118, and a second data word may include sample point 120, trigger type 124, and sequence number 126.

As discussed above, contextual information 114A may indicate the location of the portion of the representation of the physical layer data included in the particular segment within the frame of the optical network. For instance, contextual information 114A may include one or more of start location 116 which may indicate a start location of PON frame segment 112A within PON frame 110, stop location 118 which may indicate a stop location of PON frame segment 112A within PON frame 110, and sequence number 126 which may indicate a segment identifier of PON frame segment 112A (e.g., segment number X of Y). In some example, the sequence number may be used (e.g., by the device that received frames 124) to determine whether all of PON frame segments 112 have been received and/or to separate PON frame segments 112 of PON frame 110 from PON frame segments of other PON frames.

Also, as discussed above, contextual information 114A may indicate a trigger condition that caused identification module 92 to store PON frame 110 (i.e., the representation of the physical layer data included in PON frame segment 112A). For instance, contextual information 114A may include trigger type 124 which may indicate the trigger condition that caused identification module 92 to capture PON frame 110 to be stored/recorded (e.g., manual, miss, bip8 error, etc.).

Also, as discussed above, contextual information 114A may indicate sampling information for the physical layer data. For instance, contextual information 114A may include sample point 120 which may indicate where PON frame 110 was sampled. Multiple sample points may be supported. A one example, sample point 120 may indicate whether PON frame 110 was samples before or after the application of forward error correction (e.g., pre-FEC or post-FEC). As another example, sample point 120 may indicate whether PON frame 110 was sampled before or after encryption, such as advanced encryption standard (AES), is applied (pre-AES or post-AES). As another example, sample point 120 may indicate whether PON frame 110 includes downsampled data (e.g., a single bit for each bit of PON frame 110) or oversampled data (e.g., multiple bits for each bit of PON frame 110).

Figure 7:
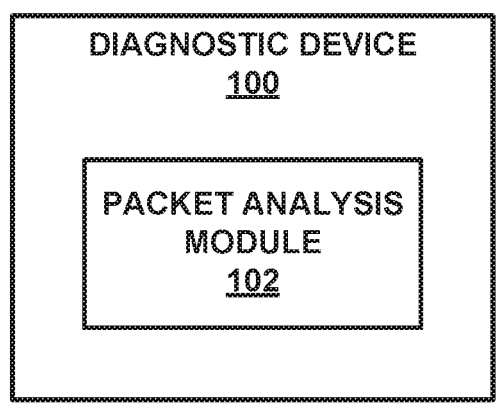
FIG. 7 is a block diagram illustrating an example diagnostic device, in accordance with one or more techniques of this disclosure.

FIG. 7 is a block diagram illustrating an example diagnostic device, in accordance with one or more techniques of this disclosure. Diagnostic device 100 of FIG. 7 may be used to debug an optical network, such as optical network 10 of FIG. 1 or optical network 90 of FIG. 3. For instance, diagnostic device 100 may receive data from an OND, such as OND 60 of FIG. 3, and present the received data to a user (e.g., a network administrator/technician). In this way, diagnostic device 100 may enable the user to debug the optical network without directly attaching diagnostic device 100 to the optical network. Examples of diagnostic device 100 include, but are not limited to, laptops, desktops, tablets, "smart phones," server systems, and the like.

As discussed above, diagnostic device 100 may receive data from an OND. In some examples, diagnostic device 100 may device the data from the OND via a network, such as network 62 of FIG. 3. The network may be any type of network capable of transporting data from the OND to diagnostic device 100. For instance, the network may include one or more of a local area network (LAN), a wide area network (WAN), the internet, and the like. As such diagnostic device 100 may not necessarily be located near the OND or the optical network being debugged. For instance, diagnostic device 100 may be located in a different state or country than the OND or the optical network being debugged. However, in some examples, diagnostic device 100 may be co-located with the OND.

The data received by diagnostic device 100 may include an encapsulated representation of physical layer data of an optical network to be debugged. In some examples, diagnostic device 100 may receive the encapsulated representation of the physical layer data of the optical network in the form of a plurality of packets that may each include a portion of the representation of the physical layer data and corresponding contextual information. As such, in some examples, diagnostic device 100 may include packet analysis module 102 which may be configured to analyze the plurality of packets. For instance, packet analysis module 102 may utilize the contextual information to reconstruct the portions of the representation of the physical layer data into a single unit (e.g., a single PON frame). In some examples, packet analysis module 102 may perform operations similar to well-known packet analyzers, such as Wireshark which may be downloaded at www.wireshark.org.

In any case, diagnostic device 100 may present the data to a user (e.g., a network administrator/technician) such that the user may debug the optical network. For instance, diagnostic device 100 may generate and output a graphical user interface that includes a graphical representation of the data. In this way, diagnostic device 100 may enable the user to debug the optical network without directly attaching diagnostic device 100 to the optical network.

Figure 8:
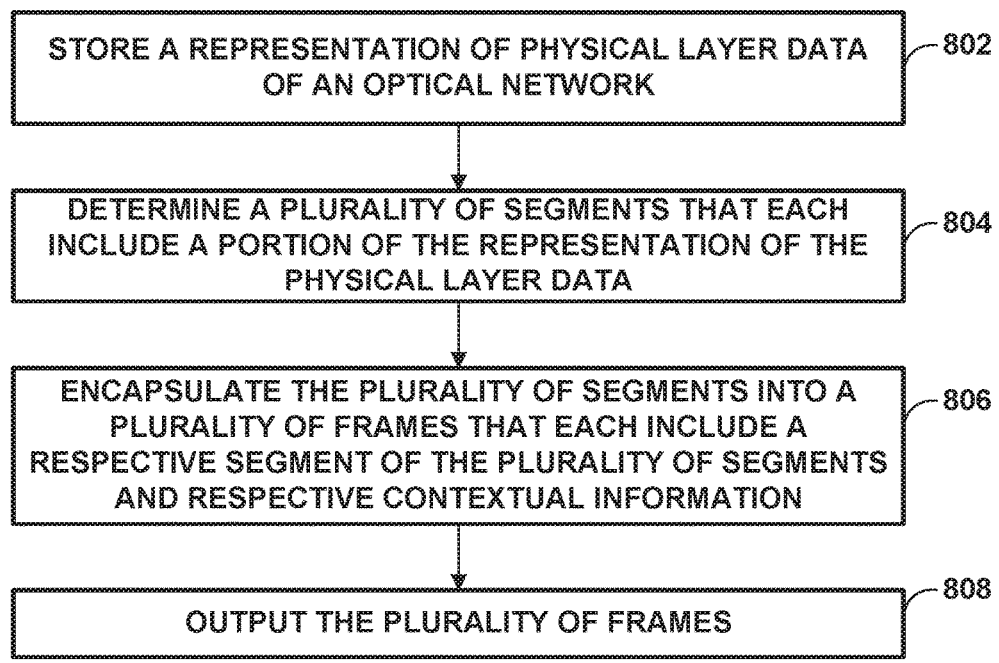
FIG. 8 is a flowchart illustrating an example method of operation of network interface device in accordance with techniques described in this disclosure.

FIG. 8 is a flow diagram illustrating example operations of an OND to output an encapsulated representation of physical layer data of the optical network, in accordance with one or more techniques of the disclosure. The techniques of FIG. 8 may be performed by an OND, such as OND 60 illustrated in FIG. 3. For purposes of illustration, the techniques of FIG. 8 are described within the context of OND 60 illustrated in FIG. 3, although optical network devices having configurations different than that of OND 60 may perform the techniques of FIG. 8.

In accordance with one or more techniques of this disclosure, identification module 92 of monitor module 88 of OND 60 may store a representation of physical layer data of an optical network (802). As discussed above, where the optical network is a PON, the representation of the physical layer data may correspond to a PON frame. As one example, where OND 60 is an OLT, the representation of the physical layer data may correspond to a downstream PON frame generated by the OLT for output via the optical network. As another example, where OND 60 is an OLT, the representation of the physical layer data may correspond to an upstream PON frame received by the OLT from the optical network. As another example, where OND 60 is an ONU, the representation of the physical layer data may correspond to an upstream PON frame generated by the ONU for output via the optical network. As another example, where OND 60 is an ONU, the representation of the physical layer data may correspond to a downstream PON frame received by the ONU from the optical network.

Segmentation module 94 of monitor module 88 may determine a plurality of segments that each include a portion of the representation of the physical layer data (804). For instance, OND 60 may determine the plurality of segments in accordance with the techniques discussed above with reference to FIG. 5.

Encapsulation module 96 of monitor module 88 may encapsulate the plurality of segments into a plurality of frames that each include a respective segment of the plurality of segments and respective contextual information (806). In some examples, encapsulation module 96 may determine the respective contextual information in accordance with the techniques discussed above with reference to FIG. 6. As discussed above, encapsulation module 96 may encapsulate the plurality of segments into a plurality of Ethernet frames.

Processing module 84 of OND 60 may output the plurality of frames to a diagnostic device (e.g., diagnostic device 100 of FIG. 7) (808). As one example, where OND 60 is an OLT, processing module 84 may output the plurality of frames to a diagnostic device that may be utilized to debug the optical network. As another example, where OND 60 is an ONU, processing module 84 may output the plurality of frames to an OLT via the optical network. The OLT may then forward the plurality of frames to the diagnostic device. In this way, OND 60 may enable a user to debug the optical network without directly attaching a diagnostic device to the optical network.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    receiving, by an optical line terminal (OLT) coupled to a passive optical network, an optical signal that represents an upstream frame of the passive optical network;
    capturing, by the OLT and while receiving the optical signal that represents the upstream frame, a representation of physical layer data corresponding to the upstream frame of the passive optical network, wherein the representation of the physical layer data comprises samples of the optical signal;
    generating, by the OLT, an encapsulated representation of the physical layer data corresponding to the upstream frame of the passive optical network; and
    outputting, via another network different than the passive optical network, the encapsulated representation of the physical layer data to another device different than the OLT.

2. The method of claim 1, wherein generating the encapsulated physical layer data of the upstream frame of the passive optical network comprises:
    storing, by the OLT, the representation of the physical layer data corresponding to the upstream frame of the passive optical network;
    segmenting, by the OLT, the representation of the physical layer data into a plurality of segments that each include a portion of the representation of the physical layer data; and
    encapsulating, by the OLT, the plurality of segments into a plurality of frames that each include a respective segment of the plurality of segments, and
    wherein outputting comprises outputting, by the OLT and via the other network, the plurality of frames to the other device.

3. The method of claim 2, wherein the representation of the physical layer data corresponding to the upstream frame of the passive optical network comprises an oversampled representation of the optical signal corresponding to the upstream frame of the passive optical network.

4. The method of claim 2, wherein the plurality of frames are of a different frame type than the upstream frame.

5. The method of claim 2, wherein each of the plurality of frames includes respective contextual information.

6. The method of claim 5, wherein the respective contextual information for a particular segment of the plurality of segments indicates one or more of:
   a location of the portion of the representation of the physical layer data included in the particular segment within the upstream frame of the passive optical network; or
   sampling information for the physical layer data.

7. The method of claim 1, wherein the other network is not a passive optical network.

8. An optical line terminal (OLT) coupled to a passive optical network, wherein the OLT comprises:
   an optical detector configured to receive an optical signal that represents an upstream frame of the passive optical network;
   a memory; and
   one or more processors configured to:
      obtain, via the optical detector, a representation of physical layer data of the passive optical network corresponding to the upstream frame of the passive optical network, wherein the representation of the physical layer data comprises samples of the optical signal;
      generate an encapsulated representation of the physical layer data of the passive optical network; and
      output, via another network different than the passive optical network, the encapsulated representation of the physical layer data to an external device.

9. The OLT of claim 8, wherein, to generate the encapsulated physical layer data of the passive optical network, the one or more processors are configured to:
   store the representation of the physical layer data of the passive optical network;
   segment the representation of the physical layer data into a plurality of segments that each include a portion of the representation of the physical layer data; and
   encapsulate the plurality of segments into a plurality of frames that each include a respective segment of the plurality of segments, and
   wherein, to output the encapsulated representation of the physical layer data to the external device, the one or more processors are configured to output, via the other network, the plurality of frames to the external device.

10. The OLT of claim 9, wherein the representation of the physical layer data corresponding to the upstream frame of the passive optical network comprises an oversampled representation of the optical signal corresponding to the upstream frame of the passive optical network.

11. The OLT of claim 9, wherein the plurality of frames are of a different frame type than the upstream frame.

12. The OLT of claim 9, wherein each of the plurality of frames includes respective contextual information.

13. The OLT of claim 12, wherein the respective contextual information for a particular segment of the plurality of segments indicates one or more of:
   a location of the portion of the representation of the physical layer data included in the particular segment within the upstream frame of the passive optical network; or
   sampling information for the physical layer data.

14. The OLT of claim 8, wherein the external device comprises one or more server systems.

15. An optical line terminal (OLT) coupled to a passive optical network, wherein the OLT comprises:
   means for receiving an optical signal that represents an upstream frame of the passive optical network;
   means for obtaining a representation of physical layer data of the passive optical network corresponding to the upstream frame of the passive optical network, wherein the representation of the physical layer data comprises samples of the optical signal;
   means for generating an encapsulated representation of the physical layer data of the passive optical network; and
   means for outputting, via another network different than the passive optical network, the encapsulated representation of the physical layer data to an external device.

16. The OLT of claim 15, wherein the means for generating the encapsulated physical layer data of the passive optical network comprises:
   means for storing the representation of the physical layer data of the passive optical network;
   means for segmenting the representation of the physical layer data into a plurality of segments that each include a portion of the representation of the physical layer data; and
   means for encapsulating the plurality of segments into a plurality of frames that each include a respective segment of the plurality of segments, and
   wherein the means for outputting comprise means for outputting, via the other network, the plurality of frames to the external device.

17. The OLT of claim 16, wherein the representation of the physical layer data corresponding to the upstream frame of the passive optical network comprises an oversampled representation of the optical signal corresponding to the upstream frame of the passive optical network.

18. A non-transitory computer-readable storage medium storing instructions that, when executed, cause one or more processors of an optical line terminal (OLT) coupled to a passive optical network to:
   obtain a representation of physical layer data of the passive optical network corresponding to an upstream frame of the passive optical network, wherein the representation of the physical layer data comprises samples of an optical signal that corresponds to the upstream frame;
   generate an encapsulated representation of the physical layer data of the passive optical network; and
   output, via another network, the encapsulated representation of the physical layer data to an external device.

19. The non-transitory computer-readable storage medium of claim 18, wherein the instructions that cause the one or more processors to generate the encapsulated physical layer data of the passive optical network comprise instructions that cause the one or more processors to:
   segment the representation of the physical layer data into a plurality of segments that each include a portion of the representation of the physical layer data; and
   encapsulate the plurality of segments into a plurality of frames that each include a respective segment of the plurality of segments, and
   wherein the instructions that cause the one or more processors to output comprise instructions that cause the one or more processors to output, via the other network, the plurality of frames to the external device.

20. The non-transitory computer-readable storage medium of claim 19, wherein the representation of the physical layer data corresponding to the upstream frame of the passive optical network comprises an oversampled representation of the optical signal corresponding to the upstream frame of the passive optical network.

\* \* \* \* \*